(12) United States Patent
Chen et al.

(10) Patent No.: US 11,628,896 B2
(45) Date of Patent: Apr. 18, 2023

(54) COMPOSITE MOTION ROBOT BASED ON SPRINGTAIL MOVEMENT MECHANISM

(71) Applicant: Yanshan University, Qinhuangdao (CN)

(72) Inventors: Ziming Chen, Qinhuangdao (CN); Xuechan Chen, Qinhuangdao (CN); Kun Zhao, Qinhuangdao (CN); Chen Zhao, Qinhuangdao (CN); Wenjiang Yan, Qinhuangdao (CN); Nan Li, Qinhuangdao (CN); An Yin, Qinhuangdao (CN); Yu Guo, Qinhuangdao (CN); Jingke Song, Qinhuangdao (CN)

(73) Assignee: YANSHAN UNIVERSITY, Qinhuangdao (CN)

( * ) Notice: Subject to any disclaimer, the term of this patent is extended or adjusted under 35 U.S.C. 154(b) by 406 days.

(21) Appl. No.: 17/104,048

(22) Filed: Nov. 25, 2020

(65) Prior Publication Data
US 2021/0163088 A1    Jun. 3, 2021

(30) Foreign Application Priority Data
Nov. 29, 2019    (CN) .......................... 201911203547.0

(51) Int. Cl.
  *B62D 57/02*    (2006.01)
  *B25J 5/00*    (2006.01)
  *B25J 19/00*    (2006.01)

(52) U.S. Cl.
  CPC .............. *B62D 57/02* (2013.01); *B25J 5/007* (2013.01); *B25J 19/0008* (2013.01)

(58) Field of Classification Search
  CPC ...... B62D 57/02; B25J 19/0008; A63H 11/06; A63H 11/08; A63H 19/04; A63H 29/04; A63H 13/02; Y10T 74/18528
  USPC ......................................... 446/464, 312, 311
  See application file for complete search history.

(56) References Cited

U.S. PATENT DOCUMENTS

| | | | |
|---|---|---|---|
| 6,548,982 B1 * | 4/2003 | Papanikolopoulos | B62D 57/02 446/457 |
| 8,083,013 B2 * | 12/2011 | Bewley | B62D 37/00 180/199 |
| 10,828,973 B2 * | 11/2020 | Kossett | B60K 1/02 |
| 2005/0133280 A1 * | 6/2005 | Horchler | B62D 57/022 180/8.1 |

(Continued)

FOREIGN PATENT DOCUMENTS

WO    WO-2011017668 A2 *    2/2011    ............. B25J 5/005

*Primary Examiner* — Minnah L Seoh
*Assistant Examiner* — Ryan Edward Hardy
(74) *Attorney, Agent, or Firm* — IPro, PLLC; Na Xu

(57) ABSTRACT

The invention relates to a composite motion robot based on springtail movement mechanism, which includes a body, a jumping mechanism, a balance wheel and a control module. The body includes a right pallet, a U-shaped frame, a curved slide, a casing, a fixing plate, a left pallet and a pin block; the control module is installed on the body. Based on springtail jumping motion mechanism and by setting the jumping mechanism and the balance wheel, the invention enables the robot to have capability of movement, such as jumping over obstacles, balance wheeled translation, flipping posture reset, and self-balance resetting which is otherwise difficult to be achieved by traditional balancing carts, etc.

6 Claims, 5 Drawing Sheets

(56) References Cited

U.S. PATENT DOCUMENTS

2018/0178381 A1\* 6/2018 Lee ........................ B62D 61/00

\* cited by examiner

COMPOSITE MOTION ROBOT BASED ON SPRINGTAIL MOVEMENT MECHANISM

TECHNICAL FIELD

The present invention belongs to the technical field of robot, and in particular relates to a composite motion robot based on springtail movement mechanism.

BACKGROUND

With the development of technology, robot technology has been widely used in all aspects, especially in the fields of interstellar exploration, life rescue, and military reconnaissance. There are various types of complex and unstructured working environments, which require robots to be small in volume and have a strong ability to overcome obstacles.

Jumping is a very common movement mode in nature, such as for frogs, kangaroos and locusts. Compared with crawling, jumping has the characteristics of wide range of motion, highly efficient movement and strong explosive power. Therefore, the jumping function is widely used in the field of robot. Especially, it is suitable for application in unstructured working environment. However, the existing jumping robots are not only complex in structure and low efficient in energy utilization, but also have a relatively single motion form, which cannot achieve continuous jumping, and have greater limitation on the adaptability to complex environment.

At the same time, the researchers found that the springtail is a highly athletic collembola. It can not only rely on the elastic device at the end of the abdomen to achieve 200 times the jumping distance of the body in a very short time, but also can be compatible with the crawling structure to achieve efficient crawling movement. Therefore, how to design a composite motion robot based on springtail movement mechanism with simple structure, good flexibility, high energy utilization and traditional high-efficient movement way is a technical problem need to be solved in the present invention.

SUMMARY OF THE INVENTION

In view of the above situation, the present invention provides a composite motion robot based on springtail movement mechanism, which realizes the functions of jumping over obstacles and posture resetting through the jumping mechanism, realizes highly efficient wheeled movement through the balance wheel structure, realizes the robot motion switching, posture collection and remote communication feedback function etc., through the control module, therefore can be applied to the fields of earthquake rescue, detection of complex terrain environment and emergency avoidance of robots, etc., and has advantage of simple structure, good flexibility, high energy utilization, strong operability, etc.

The technical solution adopted by the present invention is a composite motion robot based on springtail movement mechanism which includes a body, a jumping mechanism, a balance wheel and a control module; the body includes a right pallet, a U-shaped frame, a curved slide, a casing, a fixing plate, a left pallet and a pin block; the first end of the right pallet is connected to the first end surface of the U-shaped frame; the curved slide is arranged in the middle position of the U-shaped frame; the second end surface of the U-shaped frame is provided with the casing; the first end and the second end of the casing is respectively provided with the fixing plate and the left pallet; the left pallet is arranged directly below the fixing plate; and the pin block is provided on the first side of the U-shaped frame; the jumping mechanism includes a base handle assembly, a metamorphic motion pair assembly and a pitch assembly; the base handle assembly includes a first connecting disc, a second connecting disc, a base handle block, a base handle stopper and a base handle pin; the first connecting disc and the second connecting disc are respectively provided at the first end of the base handle block, and both are fixedly connected to the base handle block; the base handle stopper is installed on the base handle pin; both of the first end and the second end of the base handle pin are fixedly connected to the base handle block; the metamorphic motion pair assembly includes a torsion spring one, a torsion spring two, a torsion spring three, a torsion spring four and a connecting pin; the connecting pin is arranged at the second end of the base handle block, and is connected to the base handle block through rotation pair; the torsion spring one, the torsion spring two, the torsion spring three and the torsion spring four are installed in sequence on the connecting pin; and the first end and the second end of the torsion spring one, the torsion spring two, the torsion spring three and the torsion spring four are respectively fixedly connected to the base handle stopper and the pitch block in the pitch assembly; the pitch assembly includes a pitch block, a pitch pin, a left pitch rod, a right pitch rod, a pitch stopper, a sleeve one, a sleeve two, a sleeve three, a sleeve four, a roller stopper one, a roller stopper two, a roller shaft, a roller one, a roller two and a roller three; the first end of the pitch block is rotatably connected to the connecting pin; the pitch stopper is fixedly installed on the pitch pin; both of the first end and the second end of the pitch pin are fixedly connected to the pitch block; the second end of the pitch block is respectively provided with the left pitch rod and the right pitch rod; the first end of the left pitch rod and the first end of the right pitch rod are respectively provided with the roller stopper one and the roller stopper two; two sides of the roller stopper one are provided with the sleeve one and the sleeve two; two sides of the roller stopper two are provided with the sleeve three and the sleeve four; the first end and the second end of the roller shaft are respectively connected to the roller stopper one and the roller stopper two; and the roller one, the roller two and the roller three are rotatably installed in the middle of the roller shaft in sequence; and the jumping mechanism is installed on the pin block through the first connecting disc; the second connecting disc is connected to the output shaft of the magnetic encoding motor in the control module; the balance wheel includes a left balance wheel and a right balance wheel; the left balance wheel and the right balance wheel are respectively installed on two sides of the body; and the control module is installed on the body.

The characteristics and beneficial effects of the present invention are:

1. The present invention provides a composite motion robot based on springtail movement mechanism. The morphological and functional bionic design of the jumping organ of the springtail is done to design a new type of jumping execution structure, which has a simple structure and is convenient to be driven so that it is easy to develop toward the miniaturization direction, and at the same time, can be fast executed so that multiple rapid intermittent jumping can be performed.

2. The invention provides a composite motion robot based on springtail movement mechanism. Based on the springtail movement mechanism, it not only realizes the good structural compatibility of the jumping structure and the balance wheel structure, but also enables the robot to have multiple movements mode.

3. The invention provides a composite motion robot based on springtail movement mechanism, which has the function of jumping over obstacles, balance wheeled translation, flipping posture reset, and self-balance resetting which is otherwise difficult to be achieved by traditional balancing carts. In addition, the robot motion switching, posture collection and remote communication feedback function can be realized by a control module, therefore it has the advantage of simple structure, good flexibility, high energy utilization, and strong operability, etc.

MAIN REFERENCE SIGNS

1—body; 11—right pallet; 12—U—shaped frame; 13—curved slide; 14—casing; 15—fixing plate; 16—left pallet; 17—pin block; 2—jump mechanism; 20—first connecting disc; 21—second connecting disc; 22—base handle block; 23—connecting pin; 24—torsion spring one; 25—torsion spring two; 26—pitch block; 27—pitch pin; 28—left pitch rod; 29—sleeve one; 210—roller stopper one; 211—sleeve two; 212—roller shaft; 213—roller one; 214—roller two; 215—roller three; 216—sleeve three; 217—roller stopper two; 218—sleeve four; 219—right pitch rod; 220—pitch stopper; 221—torsion spring three; 222—torsion spring four; 223—base handle stopper; 224—base handle pin; 3—balance wheel; 31—left wheel; 32—left reducer; 33—left motor bracket; 34—left DC motor; 35—left Hall encoder; 36—right Hall encoder; 37—right DC motor; 38—right motor bracket; 39—right reducer; 310—right wheel; 4—control module; 41—magnetic encoding motor; 42—magnetic encoding driver; 43—DC motor driver; 44—gyroscope; 45—main control board; 46—Bluetooth module; 47—Lithium battery.

DETAILED DESCRIPTION

In order to detail the technical content, structural feature, achieved objective and effect of the present invention, a detailed description will be given below in conjunction with the accompanying drawings of the specification.

Figure 1:
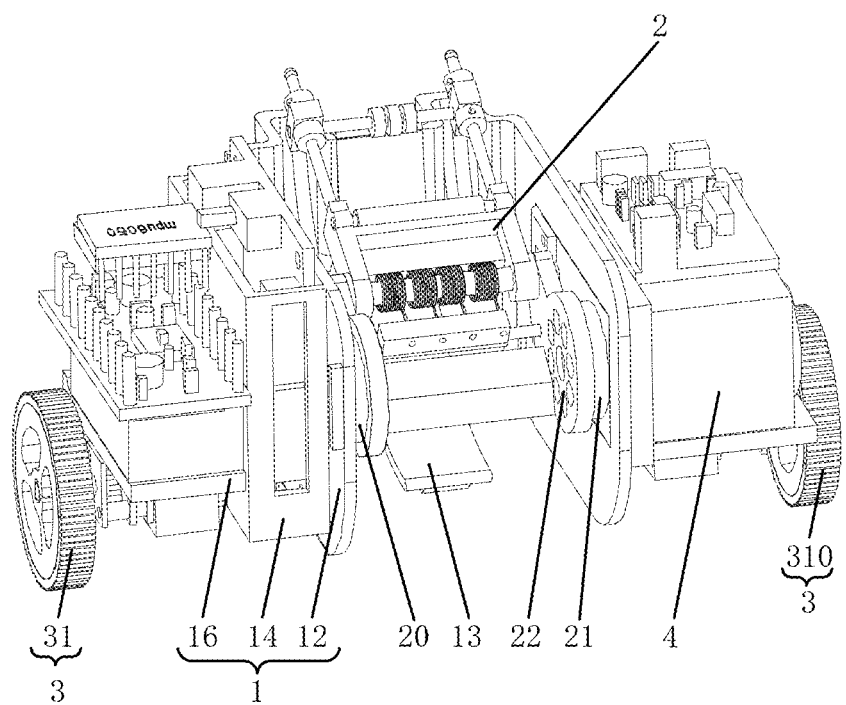
FIG. 1 is a schematic diagram of the overall structure of the present invention.
Figure 2:
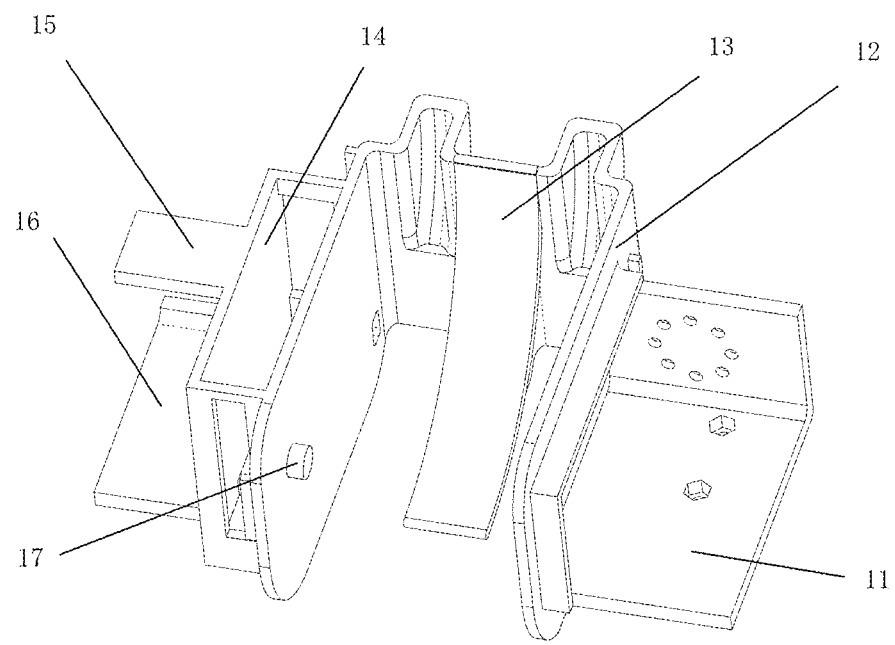
FIG. 2 is a schematic diagram of the body structure of the present invention.

The present invention provides a composite motion robot based on the movement mechanism of the springtail, as shown in FIG. 1 and FIG. 2, which includes a body 1, a jumping mechanism 2, a balance wheel 3 and a control module 4. The body 1 includes a right pallet 11, an U-shaped frame 12, a curved slide 13, a casing 14, a fixing plate 15, a left pallet 16 and a pin block 17; the first end of the right pallet 11 is connected to the first end surface of U-shaped frame 12; the curved slide 13 is arranged in the middle position of the U-shaped frame 12; the second end surface of the U-shaped frame 12 is provided with the casing 14; the first end and the second end of the casing 14 is respectively provided with the fixing plate 15 and the left pallet 16; the left pallet 16 is arranged directly below the fixing plate 15; and the pin block 17 is arranged on the first side of the U-shaped frame 12.

Figure 3:
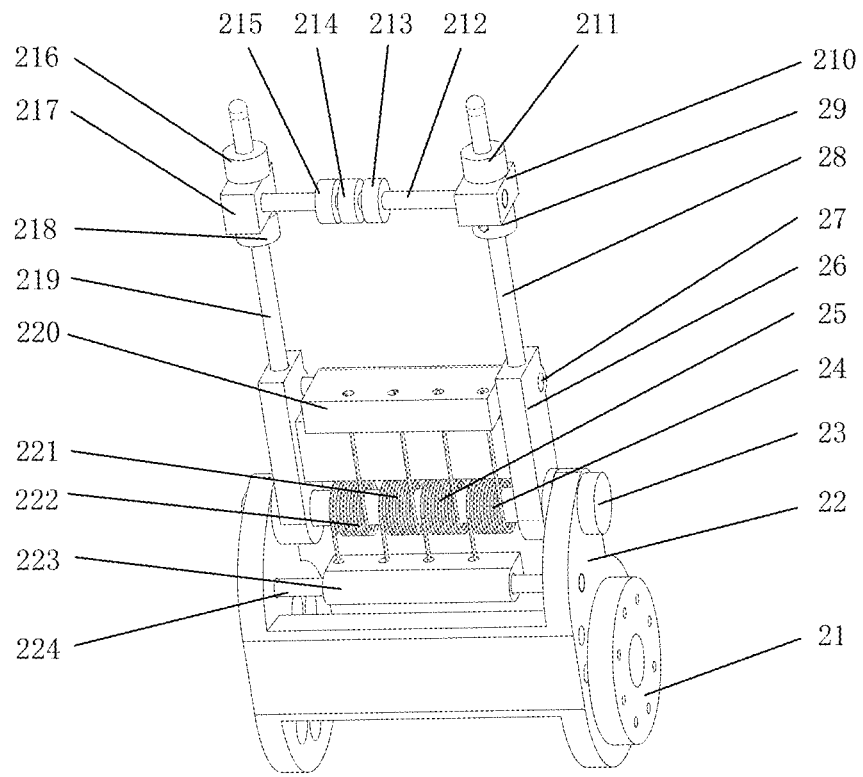
FIG. 3 is a schematic diagram of the jumping mechanism structure of the present invention.

As shown in FIG. 3, the jumping mechanism 2 includes a base handle assembly, a metamorphic motion pair assembly, and a pitch assembly. The base handle assembly includes a first connecting disc 20, a second connecting disc 21, a base handle block 22, a base handle stopper 223 and a base handle pin 224; the first connecting disc 20 and the second connecting disc 21 are respectively provided at the first end of the base handle block 22, and both are fixedly connected to the base handle block 22; the base handle stopper 223 is installed on the base handle pin 224; both of the first end and the second end of the base handle pin 224 are fixedly connected to the base handle block 22; the metamorphic motion pair assembly includes a torsion spring one 24, a torsion spring two 25, a torsion spring three 221, a torsion spring four 222 and a connecting pin 23; the connecting pin 23 is arranged at the second end of the base handle block 22, and is connected to the base handle block 22 through a rotation pair. The torsion spring one 24, the torsion spring two 25, the torsion spring three 221 and the torsion spring four 222 are installed in sequence on the connecting pin 23; and the first end and the second end of the torsion spring one 24, the torsion spring two 25, the torsion spring three 221 and the torsion spring four 222 are respectively fixedly connected to the base handle stopper 223 and the pitch block 220 in the pitch assembly. The pitch assembly includes a pitch block 26, a pitch pin 27, a left pitch rod 28, a right pitch rod 219, a pitch stopper 220, a sleeve one 29, a sleeve two 211, a sleeve three 216, a sleeve four 218, a roller stopper one 210, a roller stopper two 217, a roller shaft 212, a roller one 213, a roller two 214 and a roller three 215; the first end of the pitch block 26 is rotatably connected to the connecting pin 23; the pitch stopper 220 is fixedly installed on the pitch pin 27; both of the first end and the second end of the pitch pin 27 are fixedly connected to the pitch block 26; the second end of the pitch block 26 is respectively provided with left pitch rod 28 and right pitch rod 219; the first end of the left pitch rod 28 and the first end of the right pitch rod 219 are respectively provided with the roller stopper one 210 and the roller stopper two 217; two sides of the roller stopper one 210 are provided with the sleeve one 29 and sleeve two 211; two sides of the roller stopper two 217 are provided with sleeve three 216 and sleeve four 218; the first end and the second end of the roller shaft 212 are respectively connected to the roller stopper one 210 and the roller stopper two 217; and the roller one 213, the roller two 214 and the third roller 215 are rotatably installed in the middle of the roller shaft 212 in sequence.

The jumping mechanism 2 is installed on the pin block 17 through the first connecting disc 20; the second connecting disc 21 is connected to output shaft of magnetic encoding motor 41 in control module 4; the balance wheel includes a left balance wheel and a right balance wheel; the left balance wheel and the right balance wheel are respectively installed on two sides of the body 1; and the control module 4 is installed on the body 1.

Specifically, both of the sleeve one 29 and the sleeve two 211 are fixedly connected to the left pitch rod 28; the first end surface of the sleeve one 29 coincides with the first end surface of the roller stopper one 210; the first end surface of the sleeve two 211 coincides with the second end surface of the roller block one 210; both of the sleeve three 216 and the sleeve four 218 are fixedly connected to the right pitch rod 219; the first end surface of the sleeve three 216 coincides with the first end surface of the roller block two 217; the first end surface of the sleeve four 218 coincides with the second end surface of the roller stopper two 217; and the roller diameters of the roller one 213, the roller two 214 and the roller three 215 are all equal.

Figure 4:
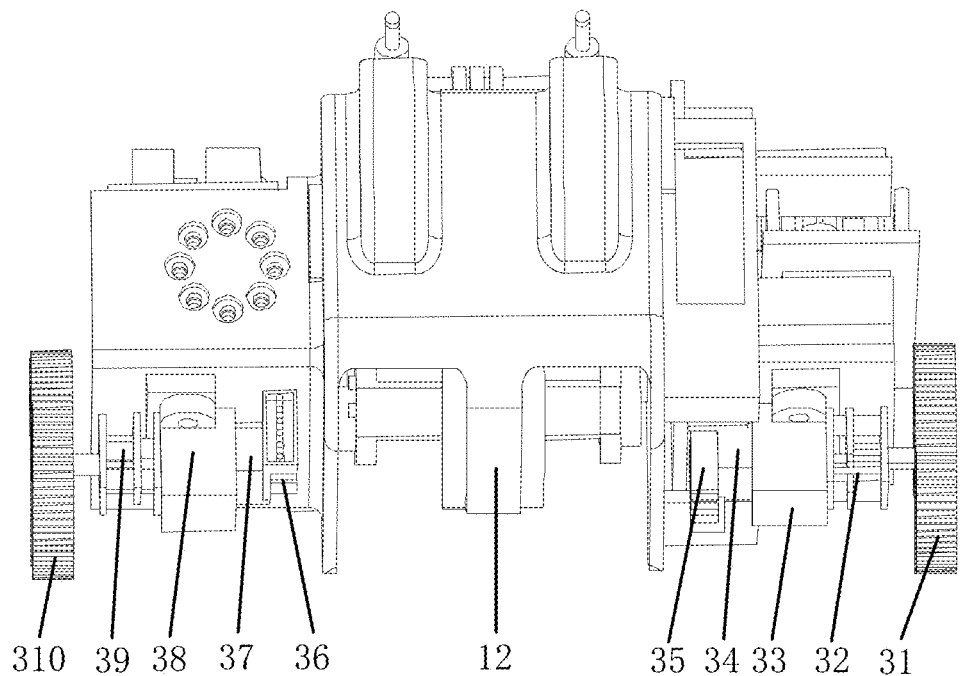
FIG. 4 is a schematic diagram of the balance wheel structure of the present invention.

As shown in FIG. 4, the balance wheel includes the left balance wheel and the right balance wheel. The left balance wheel includes a left Hall encoder 35, a left DC motor 34, a left motor bracket 33, a left reducer 32 and a left wheel 31; the left Hall encoder 35 is arranged at the first end of the left DC motor 34; the left DC motor 34 is installed on the left motor bracket 33; the left motor bracket 33 is installed on the left pallet 16; the output shaft of the left DC motor 34 is connected to the input shaft of the left reducer 32; the output shaft of the left reducer 32 is connected to the left wheel 31; the right balance wheel includes a right Hall encoder 36, a right DC motor 37, a right motor bracket 38, a right reducer 39 and a right wheel 310; the right Hall encoder 36 is arranged at the first end of the right DC motor 37; the right DC motor 37 is installed on the right motor bracket 38; the right motor bracket 38 is installed on the right pallet 11; the output shaft of the right DC motor 37 is connected to the input shaft of the right reducer 39; and the output shaft of the right reducer 39 is connected to the right wheel 310.

Figure 5:
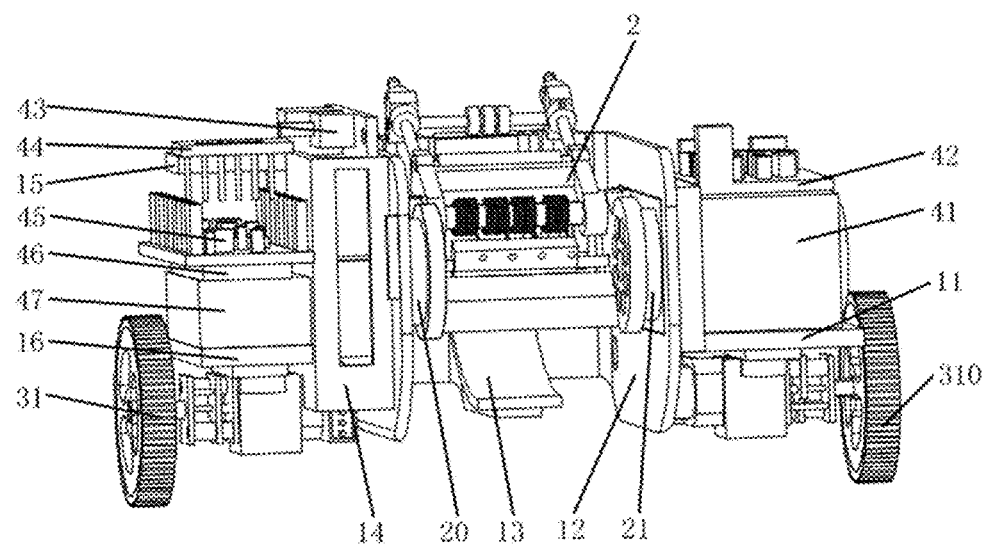
FIG. 5 is a schematic diagram of the control module of the present invention.

As shown in FIG. 5, the control module 4 includes a magnetic encoding motor 41, a magnetic encoding driver 42, a DC motor driver 43, a gyroscope 44, a main control board 45, a Bluetooth module 46 and a Lithium battery 47. The magnetic encoding driver 42 is arranged on the magnetic encoding motor 41 so that the circuit driving to the magnetic encoding motor 41 can be realized. At the same time, the magnetic encoding motor 41 provides power for the jumping structure. The magnetic encoding motor 41 is installed on the right pallet 11; the DC motor driver 43 is arranged in the casing 14 so that the circuit driving to the left DC motor 34 and the right DC motor 37 can be realized. The gyroscope 44 is installed on the fixing plate 15 so that the collection of the robot's movement posture can be realized. The main control board 45, the Bluetooth module 46 and the Lithium battery 47 are all installed on the left pallet 16; storage and operation of the control program is realized by the main control board 45; remote communication and information feedback is realized by the Bluetooth module 46; and energy source for the robot is provided by the Lithium battery 47.

The specific operation steps of the present invention are as follows:

A composite motion robot based on springtail movement mechanism of the present invention, as shown in FIGS. 1 to 5, includes the body 1, the jumping mechanism 2, the balance wheel 3 and the control module 4. The body 1 includes the right pallet 11, the U-shaped frame 12, the curved slide 13, the casing 14, the fixing plate 15, the left pallet 16 and the pin block 17; the jumping mechanism 2 includes the base handle assembly, the metamorphic motion pair assembly and the pitch assembly; The balance wheel includes the left balance wheel and the right balance wheel. The left balance wheel includes the left Hall encoder 35, the left DC motor 34, the left motor bracket 33, the left reducer 32, and the left wheel 31. The right balance wheel includes the right Hall encoder 36, the right DC motor 37, the right motor bracket 38, the right reducer 39 and the right wheel 310; the control module 4 includes the magnetic encoding motor 41, the magnetic encoding driver 42, the DC motor driver 43, the gyroscope 44, the main control board 45, the Bluetooth module 46 and the Lithium battery 47; the jumping mechanism 2 is installed on the pin block 17 through the first connecting disk 20; the second connecting disk 21 is connected to the output shaft of the magnetic encoding motor 41 in the control module 4; the left balance wheel and the right balance wheel are separately installed on two sides of the body 1; and the control module 4 is installed on the body 1.

Figure 6:
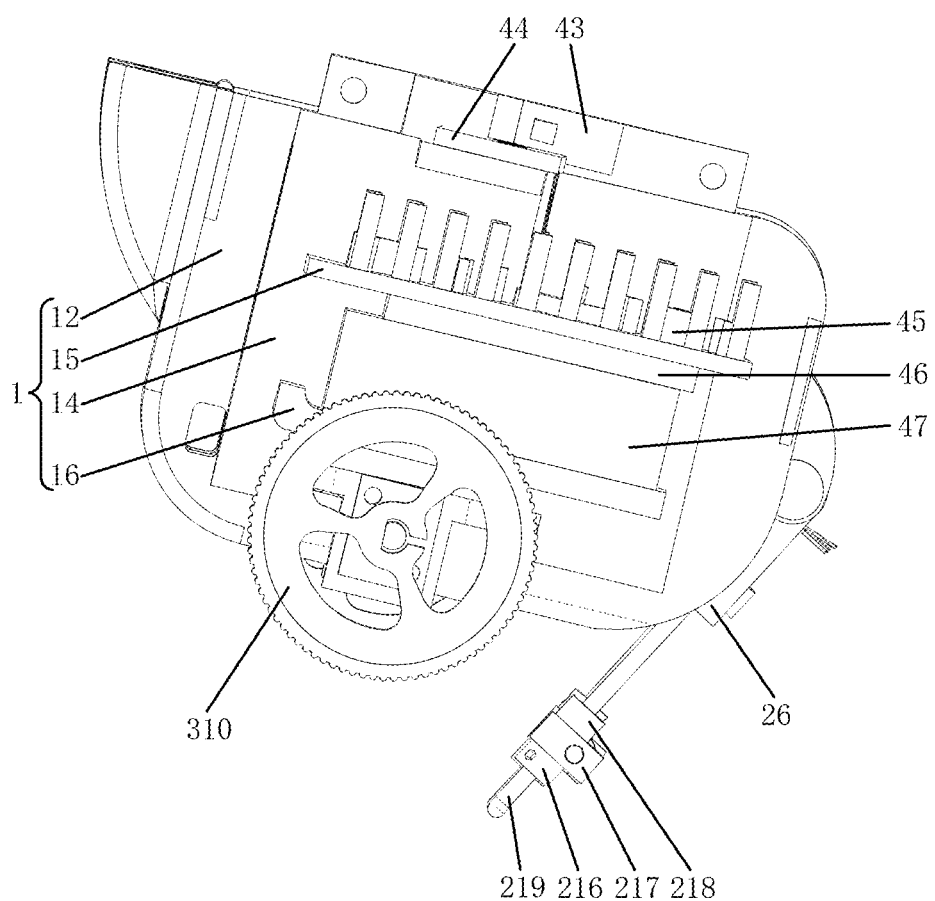
FIG. 6 is a schematic diagram of the jumping posture of the present invention.

As shown in FIG. 6, when the robot is in jumping mode, the magnetic encoding motor 41 is actuated so that the magnetic encoding motor 41 rotates forward to drive the base handle block 22 to rotate, and at the same time to drive the roller one 213, the roller two 214 and the roller three 215 to slide on the curved slide 13, therefore the pitch block 26 rotates relative to the connecting pin 23 and the base handle block 22. At this time, the torsion spring one 24, the torsion spring two 25, the torsion spring three 221 and the torsion spring four 222 accumulate torsion spring energy. When the roller one 213, the roller two 214 and roller three 215 just roll out of the curved slide 13, the left pitch rod 28 and the right pitch rod 219 quickly act on the ground, so that the torsion spring energy accumulated in the torsion spring one 24, the torsion spring two 25, the torsion spring three 221 and the torsion spring two 22 is converted into the kinetic energy of the robot's jumping, so as to complete the jumping process.

When the robot is in wheeled movement mode, the gyroscope 44 in the control module 4 collects the robot's posture data, the main control board 45 completes data processing and program operation, and the DC motor driver 43 drives the left DC motor 34 and the right DC motor 37 in the balance wheel 3, so as to drive the left wheel 31 and the right wheel 310 to rotate, and then maintain the balance wheeled movement of the robot.

Figure 7:
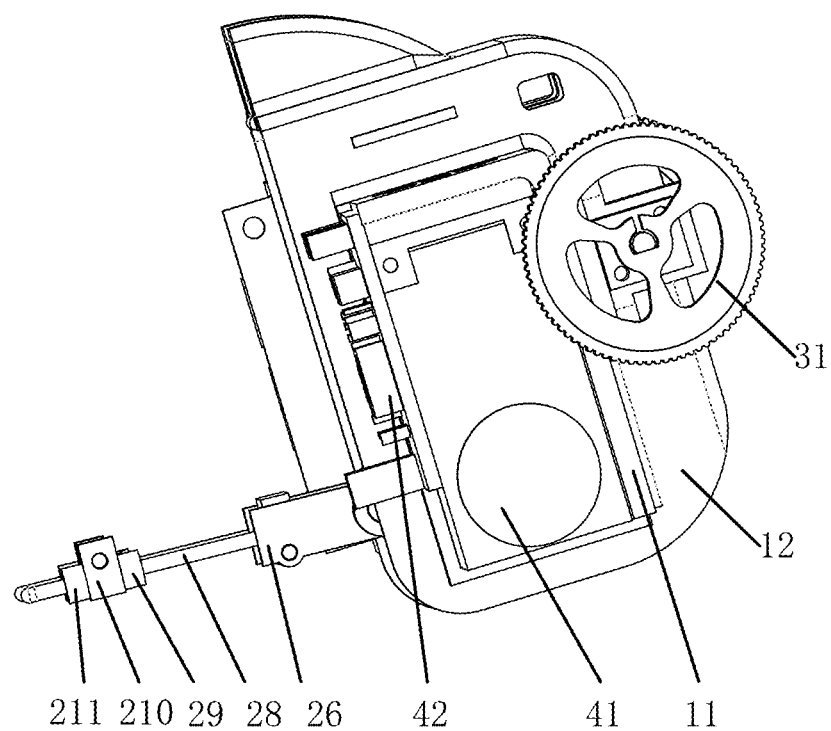
FIG. 7 is a schematic diagram of the posture reset of the present invention.

As shown in FIG. 7, when the robot is in flipping posture reset mode, the magnetic encoding motor 41 rotates in a reverse direction, so that the pitch block 26 and the base handle block 22 rotate together in the reverse direction under the action of the torsion spring one 24, torsion spring two 25, torsion spring three 221 and torsion spring four 222. When the ends of the left pitch rod 28 and the right pitch rod 219 are in contact with the ground, the robot performs a flipping posture action as a whole until the posture correction is completed.

The above-mentioned embodiments only describe the preferred embodiments of the present invention and do not limit the scope of the present invention. Without departing from the design spirit of the present invention, modifications and improvements made by those of ordinary skill in the art should fall within the protection scope determined by the claims of the present invention.

The invention claimed is:

1. A composite motion robot based on springtail movement mechanism is characterized in that,
   comprising a body, a jumping mechanism, a balance wheel and a control module;
   the body comprising a right pallet, a U-shaped frame, a curved slide, a casing, a fixing plate, a left pallet and a pin block; the first end of the right pallet is connected to the first end surface of the U-shaped frame; the curved slide is arranged in the middle position of the U-shaped frame; the second end surface of the U-shaped frame is provided with the casing; the first end and the second end of the casing is respectively provided with the fixing plate and the left pallet; the left pallet is arranged directly below the fixing plate; and the pin block is provided on the first side of the U-shaped frame;

the jumping mechanism comprising a base handle assembly, a metamorphic motion pair assembly, and a pitch assembly; the base handle assembly comprising a first connecting disc, a second connecting disc, a base handle block, a base handle stopper and a base handle pin; the first connecting disc and the second connecting disc are respectively provided at the first end of the base handle block, and both are fixedly connected to the base handle block; the base handle stopper is installed on the base handle pin; both of the first end and the second end of the base handle pin are fixedly connected to the base handle block; the metamorphic motion pair assembly comprising a torsion spring one, a torsion spring two, a torsion spring three, a torsion spring four and a connecting pin; the connecting pin is arranged at the second end of the base handle block, and is connected to the base handle block through rotation pair; the torsion spring one, the torsion spring two, the torsion spring three and the torsion spring four are installed in sequence on the connecting pin; and the first end and the second end of the torsion spring one, the torsion spring two, the torsion spring three and the torsion spring four are respectively fixedly connected to the base handle stopper and the pitch block in the pitch assembly; the pitch assembly comprising a pitch block, a pitch pin, a left pitch rod, a right pitch rod, a pitch stopper, a sleeve one, a sleeve two, a sleeve three, a sleeve four, a roller stopper one, a roller stopper two, a roller shaft, a roller one, a roller two and a roller three; the first end of the pitch block is rotatably connected to the connecting pin; the pitch stopper is fixedly installed on the pitch pin; both of the first end and the second end of the pitch pin are fixedly connected to the pitch block; the second end of the pitch block is respectively provided with the left pitch rod and the right pitch rod; the first end of the left pitch rod and the first end of the right pitch rod are respectively provided with the roller stopper one and the roller stopper two; two sides of the roller stopper one are provided with the sleeve one and the sleeve two; two sides of the roller stopper two are provided with the sleeve three and the sleeve four; the first end and the second end of the roller shaft are respectively connected to the roller stopper one and the roller stopper two; and the roller one, the roller two and the roller three are rotatably installed in the middle of the roller shaft in sequence; the jumping mechanism is installed on the pin block through the first connecting disc; the second connecting disc is connected to the output shaft of the magnetic encoding motor in the control module;

the balance wheel comprising a left balance wheel and a right balance wheel; the left balance wheel and the right balance wheel are respectively installed on two sides of the body; and the control module is installed on the body.

2. The composite motion robot based on springtail movement mechanism according to claim 1 is characterized in that, the left balance wheel comprising a left Hall encoder, a left DC motor, a left motor bracket, a left reducer and a left wheel; the left Hall encoder is arranged at the first end of the left DC motor; the left DC motor is installed on the left motor bracket; the left motor bracket is installed on the left pallet; the output shaft of the left DC motor is connected to the input shaft of the left reducer; and the output shaft of the left reducer is connected to the left wheel.

3. The composite motion robot based on springtail movement mechanism according to claim 2 is characterized in that, the right balance wheel comprising a right Hall encoder, a right DC motor, a right motor bracket, a right reducer and a right wheel; the right Hall encoder is arranged at the first end of the right DC motor; the right DC motor is installed on the right motor bracket; the right motor bracket is installed on the right pallet; the output shaft of the DC motor is connected to the input shaft of the right reducer; and the output shaft of the right reducer is connected to the right wheel.

4. The composite motion robot based on springtail movement mechanism according to claim 3 is characterized in that, the control module comprising a magnetic encoding motor, a magnetic encoding driver, a DC motor driver, a gyroscope, a main control board, a Bluetooth module, and a Lithium Battery; the magnetic encoding driver is arranged on the magnetic encoding motor; the magnetic encoding motor is installed on the right pallet; the DC motor driver is arranged in the casing so as to enable circuit driving to the left DC motor and the right DC motor; the gyroscope is installed on the fixing plate; and the main control board, the Bluetooth module and the Lithium battery are all installed on the left pallet.

5. The composite motion robot based on springtail movement mechanism according to claim 1 is characterized in that, both of the sleeve one and the sleeve two are fixedly connected to the left pitch rod; the first end surface of the sleeve one coincides with the first end surface of the roller stopper one; the first end surface of the sleeve two coincides with the second end surface of the roller block one; both of the sleeve three and the sleeve four are fixedly connected to the right pitch rod; the first end surface of the sleeve three coincides with the first end surface of the roller block two; and the first end surface of the sleeve four coincides with the second end surface of the roller stopper two.

6. The composite motion robot based on springtail movement mechanism according to claim 1 is characterized in that, the roller diameters of the roller one, the roller two and the roller three are all equal.

* * * * *